United States Patent [19]
Grogan

[11] 3,796,075
[45] Mar. 12, 1974

[54] LOCKABLE HOOD LATCH RELEASE MECHANISM

[75] Inventor: Robert D. Grogan, Brookfield, Wis.

[73] Assignee: Briggs & Stratton Corporation, Wauwatosa, Wis.

[22] Filed: June 19, 1972

[21] Appl. No.: 264,369

[52] U.S. Cl.......................... 70/240, 70/207, 70/256
[51] Int. Cl......................... B60r 25/00, E05b 65/19
[58] Field of Search............ 70/208, 217, 224, 256, 70/367, 368, 369, 257, 207; 292/DIG. 25

[56] References Cited
UNITED STATES PATENTS

| | | | |
|---|---|---|---|
| 3,529,452 | 9/1970 | Rae................................... | 70/256 X |
| 2,065,683 | 12/1936 | Gahagan........................... | 70/224 X |
| 3,066,371 | 12/1962 | Mullens............................ | 287/80 X |
| 1,945,779 | 2/1934 | Jacobi.................................. | 70/368 |
| 1,969,011 | 8/1934 | Jacobi.............................. | 70/256 X |

Primary Examiner—Joseph H. McGlynn
Assistant Examiner—Richard P. Tremblay

[57] ABSTRACT

A hood latch release handle, for mounting in the interior of an automobile, is provided with a key controlled lock mechanism for locking the handle against latch releasing motion. A pull on the handle, when the lock mechanism is in an unlocked condition, effects release of the hood latch through a flexible cable which is attached to a stem on the handle in an exceptionally simple manner.

15 Claims, 7 Drawing Figures

3,796,075
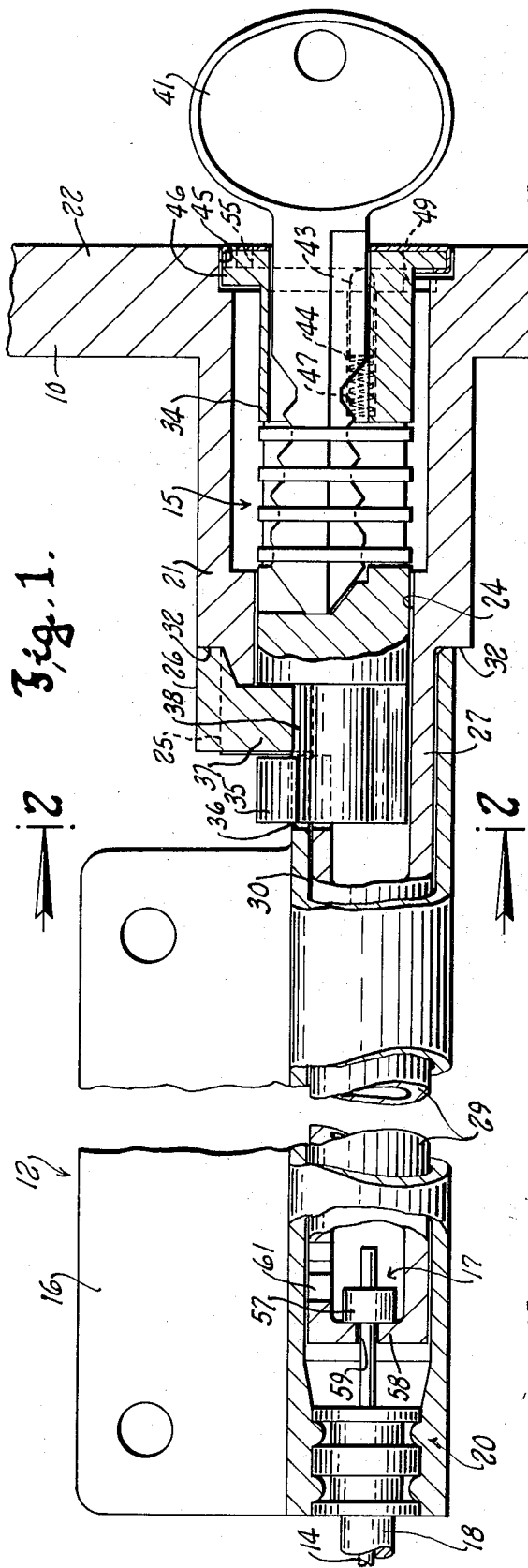
Fig. 1.
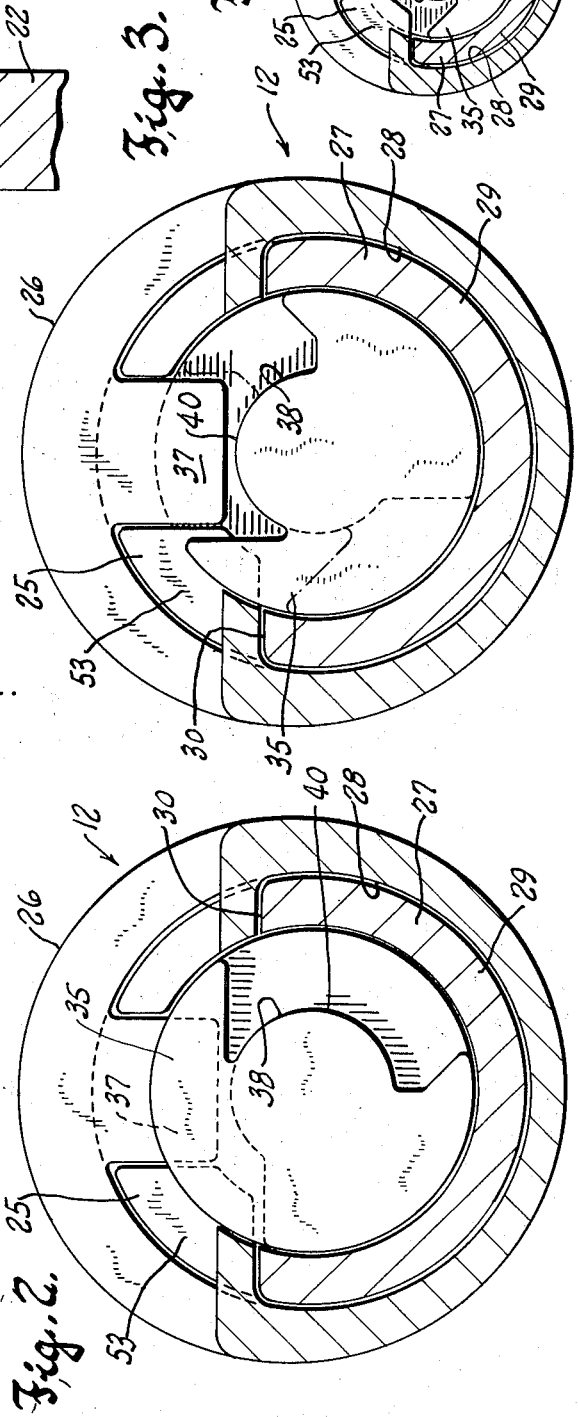
Fig. 2.
Fig. 3.
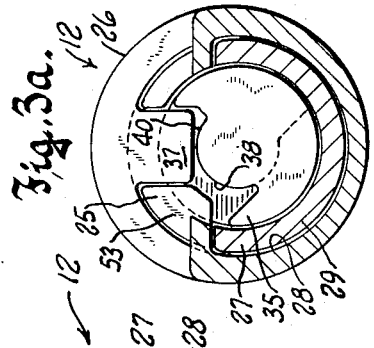
Fig. 3a.

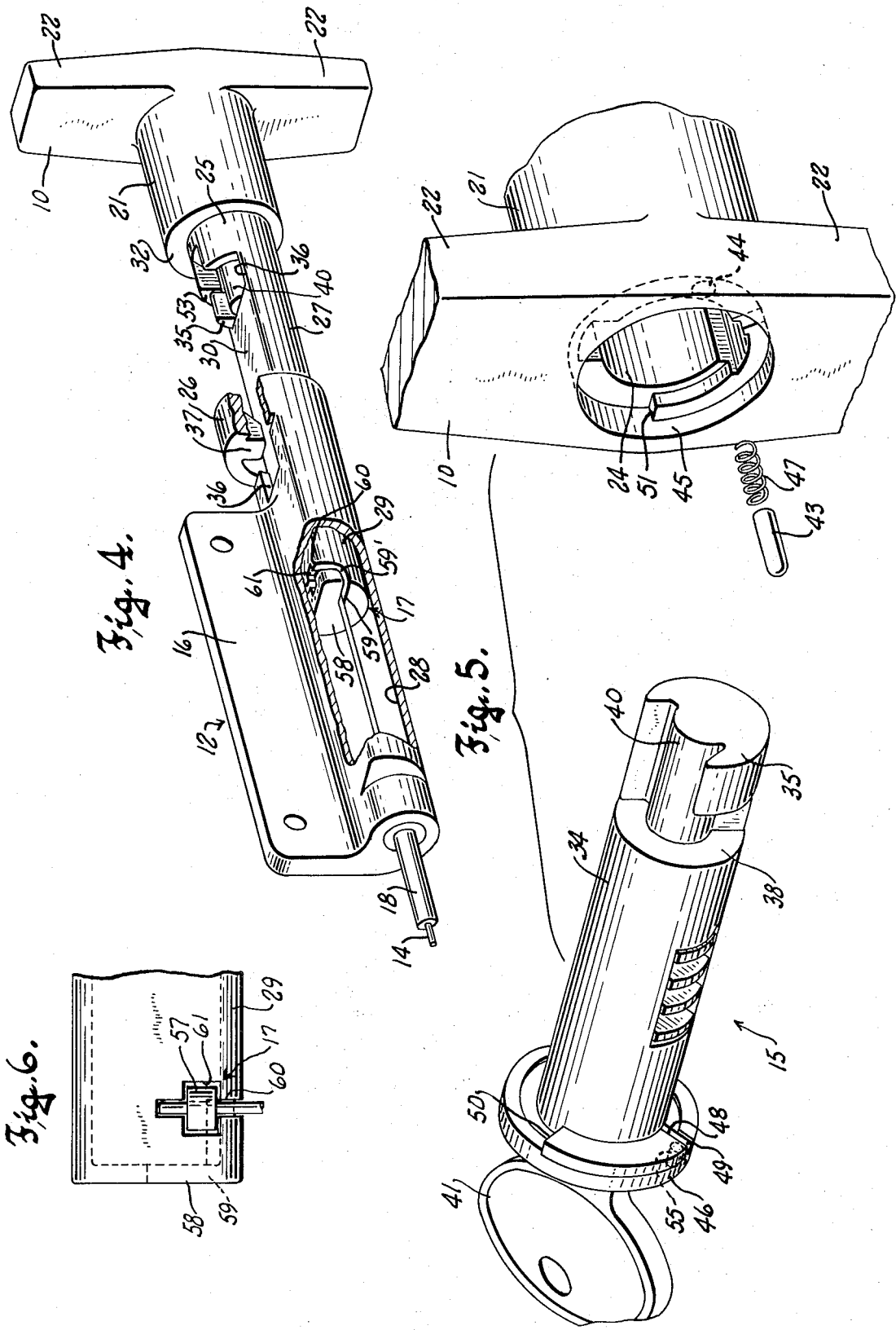

LOCKABLE HOOD LATCH RELEASE MECHANISM

This invention relates to hood latch mechanisms for automobiles, and has more particular reference to hood latch mechanisms of the type which are releasable in consequence of a pull on a handle located remote from the latch per se, usually under the instrument panel of the automobile.

Hood latch mechanisms which are thus releasable from the driver's station, inside the automobile, are acknowledged to have considerable value. Not only do they discourage theft of batteries or other accessories which are readily accessible to unauthorized persons when the hood latch is releasable from the exterior of the automobile, but they also discourage theft of the automobile itself. If the hood of the automobile can be raised at any time from its exterior, it is no great problem for a thief to install makeshift ignition leads that allow him to start the engine and keep it running while he drives off with the automobile. In fact, such practice has become more or less commonplace in large cities.

Though such thefts become more difficult when the latch release handle is mounted inside the automobile, that expedient alone did not provide assurance against unauthorized release of the hood latch unless the doors of the automobile were locked when the operator parked it. All too often, of course, the doors were left unlocked, either by neglect, or of necessity, as in most parking lots. Anyone could then actuate the "inside" mounted latch release handle and raise the hood as a preliminary to theft of the automobile, or of its battery or other accessories under the hood.

With this in mind, it is a purpose of the present invention to provide an "inside" mounted hood latch release mechanism the handle of which can be locked against movement to a latch releasing position.

More specifically, it is the object of this invention to provide an automobile hood latch release mechanism comprising a manually actuatable handle having mounted therein a key controlled lock cylinder by which the handle can be locked against unauthorized actuation even though the doors of the automobile are left in an unlocked condition.

Another object of the invention is to provide hood latch release mechanism of the character described with a handle mounting structure that serves to both retain and conceal the operating connection between the handle and the flexible cable by which the handle is operatively connected with the hood latch per se.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a view partly in side elevation and partly in section, of the locking type hood latch release mechanism of this invention;

FIG. 2 is a cross sectional view taken on the line 2—2 in FIG. 1 showing the locked condition of the hood release handle;

FIG. 3 is a view similar to FIG. 2, but showing the unlocked condition of the handle;

FIG. 3a is a view similar to FIG. 2, but on a reduced scale and illustrating the lock cylinder in a position of rotation at which it can be disassembled from the handle;

FIG. 4 is a perspective view of the mechanism seen in FIG. 1, showing the hood latch release handle in a latch releasing position;

FIG. 5 is a fragmentary perspective view looking at the front of the handle, but showing the lock cylinder removed therefrom; and FIG. 6 is a detail view illustrating how the latch release cable can be assembled with the handle.

Referring now to the accompanying drawings, the main components of the latch release mechanism of this invention will be seen to comprise a handle 10, a handle mounting or supporting bracket 12, a flexible cable 14 by which the handle is operatively connected with the hood latch (not shown) of an automobile, to effect release of the latch in consequence of the application of a pull to the handle, and a lock mechanism 15 mounted in the handle for locking the same against latch releasing motion. A flange 16 on the bracket provides for securement thereof to a stationary support (not shown) in the interior of an automobile, under its instrument panel.

The cable 14 can be connected to the handle as at 17, in a way to be described at greater length hereinafter; and it operates within a sheath 18 having one end anchored to the supporting bracket as at 20.

The handle 10 has a substantially cylindrical forward end portion 21 with opposite laterally extending wings 22 that facilitate grasping and pulling on the handle. The forward end portion 21 provides a housing for the lock mechanism 15, which latter is received within a bore 24 in the housing opening to the front of the handle. The housing has a slightly reduced cylindrical portion 25 at its rear which is coaxial with the bore 24 and is axially slidably received in the bore of a bearing 26 on the front of the handle mounting bracket 12.

The handle also has an elongated hollow stem 27 which projects rearwardly from its cylindrical portion 25 and is axially slidably received in a deep tubular socket 28 on the bracket 12. The stem is of substantially semi-cylindrical shape, having a bottom portion 29 which is arcuate in cross section and concentric to the axis of the bore 24, and a top wall 30 which is flat and lies in a plane parallel to the bore axis and spaced slightly thereabove. The socket 28 has a noncircular cross section which substantially corresponds to that of the stem which it embraces. Hence, the socket serves to guide handle motion and constrain the handle to translatory fore and aft movement along the axis of its bore 24, between a rearward latching position and a forward latch releasing position.

A spring which may be operatively connected with the hood latch, not shown, is normally provided to return the handle to its rearward limit of motion. That position of the handle is defined by the engagement of a rearwardly facing circumferential shoulder 32 thereon with the forward edge portion of the bearing 26 on the handle supporting bracket. The shoulder 32 is located at the base of the reduced handle portion 25, at its junction with the larger diameter housing 21.

The lock mechanism 15 comprises a key controlled lock cylinder 34 which is rotatably received in the bore 24 of the housing 21 provided by the front portion of the handle. The rear end portion of the lock cylinder projects through and beyond the bearing 26 on the handle supporting bracket. A lock bolt 35 is formed on the rear end portion of the cylinder, to rotate therewith from an operative position such as seen in FIG. 2 at which it locks the handle against forward latch releasing motion, to an inoperative position such as seen in FIG. 3 at which it releases the handle for forward unlatching motion. The bolt is of the same diameter as the lock cylinder and is coaxial therewith, while the hollow stem 27 and its socket 28 are substantially semi-cylindrical. This makes it possible to provide registering bolt receiving openings 36 in the superimposed wall portions of the stem and socket, in order to accommodate the upper one-half of the bolt.

The bolt 35 is cooperable with a keeper 37 fixed on the handle supporting bracket, which keeper projects substantially radially inwardly from the bore of the bearing 26 and into a circumferential groove 38 in the rear portion of the lock cylinder. The groove extends approximately three-quarters of the way around the cylinder and allows the cylinder to be rotated between defined locked and unlocked positions like those seen in FIGS. 2 and 3, without interference from the keeper.

In the locked position of cylinder rotation, an unbroken peripheral portion of the bolt is in confronting and contiguous relation with the rear of the keeper 37 to prevent forward unlatching motion of the handle. In the unlocked position of cylinder rotation, an axially extending notch 40 in the peripheral portion of the bolt registers with the keeper and provides a gate for the reception of the keeper to allow the bolt to pass the same when the handle is pulled forwardly toward its latch releasing position.

A key 41 is insertable into the front of the cylinder to retract its tumblers and thereby release the cylinder for rotation from its locked position to its unlocked position.

As here shown, the limits of cylinder rotation are defined by cooperating rotation stops on the handle and cylinder. One of the handle carried stops comprises a detent pin 43 which is disposed in a hole 44 in the handle to lie on an axis parallel to that of the bore 24, with its rounded forward end projecting into a shallow counterbore 45 in the front of the handle. A circumferential flange 46 on the front of the lock cylinder fits in this counterbore and overlies the rounded forward end of the detent pin 43. A spring 47 confined in the bottom of the hole 44 urges the pin forwardly toward engagement of its front end with the rear of the flange.

The unlocked position of cylinder rotation is defined by the engagement of a first rotation stop 48 on the cylinder flange 46 with one side of the pin 43. In this position, the rounded front end of the pin engages in a detent depression 49 in the rear of the cylinder flange, under spring pressure, to yieldingly resist rotation of the cylinder toward its locked position.

The locked position of cylinder rotation is defined by the engagement of a second rotation stop 50 on the cylinder flange with an abutment 51 on the front portion 23 of the handle, in the counterbore 45.

It should be noted from FIGS. 1 to 3 that the keeper 37 cooperates with the lock bolt 35 to hold the lock cylinder against forward displacement from its bore 24 in all except the unlocked position of cylinder rotation. It is for this purpose that the lock housing 21 is provided with a lug 53 which lies directly adjacent to one side of the keeper 37 and which is also engageable by the bolt to prevent forward displacement of the cylinder when the latter is in both its locked and its unlocked positions of rotation.

The cylinder can be disassembled forwardly from the handle, however, but in order to do so, it must be rotated to a position at which the peripheral portion of the lock bolt 36 is clear of both the lug 53 and the keeper 37. Thus, the gate defining notch 40 in the bolt is made wide enough circumferentially to accommodate both the keeper and the lug when the cylinder has been rotated approximately 45° in the clockwise direction from its unlocked position seen in FIG. 3, away from its locked position, to a position such as seen in FIG. 3a, at which the unbroken peripheral portion of the bolt also clears the lug 53.

In order to enable the cylinder to be rotated to the disassembling position seen in FIG. 3a, it is necessary to temporarily disable the handle carried rotation stop provided by the detent pin 43. For that purpose, the flange on the front of the cylinder is provided with an access hole 55 which aligns with the detent pin 43 in the unlocked position of cylinder rotation, and which enables the detent pin to be depressed into its hole by means of a stiff wire inserted into the access hole 55. Hence, when the pin is thus retracted, the cylinder can be rotated past its unlocked position of rotation to the disassembly position described above.

As mentioned earlier, the cable 14 through which the hood latch is released when the handle is pulled forwardly, is secured to the extremity of the rear stem portion on the handle in an exceptionally simple manner. For that purpose, the cable has an anchoring bead 57 fixed thereon and confined in the hollow stem 27 of the handle, to engage the inner surface of a transverse wall 58 closing the rear end thereof. The cable projects rearwardly through a slit 59 in the wall 58 to the exterior of the handle, and into the rear end of its sheath which, in the present case, is clinched in the rear end portion of the socket.

The cable receiving slit 59 extends continuously from the transverse wall 58 along one curved side wall portion of the stem, as at 59', and upwardly into the flat top wall thereof as at 60, to join with an enlarged opening 61 therein of a size to enable the bead 57 to pass therethrough.

With this arrangement, the cable can be connected to the handle stem by first threading the bead end of the cable through the socket 28 from its rear, and then passing the bead through the opening 61 to the interior of the handle stem while the cable end is held crosswise of the length of the stem, in the manner seen in FIG. 6. The cable is then moved around through the slit portion 59' and into the slit 59 in the transverse wall 58, to position it lengthwise of the stem.

With this arrangement, it will be seen that the walls of the socket 28 serve to retain the cable connected to the stem, by preventing outward displacement of the bead through the opening 61.

From the foregoing description, together with the accompanying drawings, it will be readily apparent to those skilled in the art that this invention provides a hood latch release mechanism for mounting in the passenger compartment of an automobile, by which raising of the automobile hood can be effectively prevented even though the doors of the automobile are left in an unlocked condition; and which mechanism features a rotatable lock cylinder with a lock bolt on its rear which functions not only to prevent actuation of the latch release handle in which the cylinder is mounted, but also to normally prevent disassembly of the cylinder from the handle.

Those skilled in the art will appreciate that the invention can be embodied in forms other than as herein disclosed for purposes of illustration.

The invention is defined by the following claims:

1. Lockable hood latch release mechanism, characterized by:
   A. a handle having an elongated stem fixed thereto and projecting rearwardly therefrom;
   B. means on the stem providing for attaching a hood latch release cable thereto;
   C. handle mounting structure providing a substantially deep socket in which said stem is received and guided for forward movement of the handle out of a normal hood latched position to a hood unlatching position;
   D. a keeper carried by the handle mounting structure;
   E. a manually actuable bolt carried by the handle and movable relative thereto from an operative position engaged behind the keeper to an inoperative position freeing the handle for movement forwardly to its unlatching position;
   F. key controlled lock means on the handle operatively connected with the bolt for locking the bolt in said operative position thereof;
   G. and cooperating means on the mounting bracket and the handle stem constraining the handle to forward translatory movement to its hood unlatching position.

2. The lockable hood latch release mechanism of claim 1, further characterized by:
   A. said key controlled lock means comprising a lock cylinder which is rotatable on an axis lengthwise of the socket;
   B. and the bolt being fixed to the cylinder to rotate therewith to and from said operative position thereof.

3. The lockable hood latch release mechanism of claim 2, further characterized by:
   A. said keeper projecting radially inwardly into a circumferential groove in the lock cylinder, ahead of the bolt;
   B. and the bolt being cylindrical except for a notch in its exterior which provides a gate that must be aligned with the keeper in order to free the handle for forward motion toward its unlatching position.

4. Lockable hood latch release mechanism, characterized by:
   A. a handle having an elongated stem projecting rearwardly therefrom;
   B. means on the stem providing for attaching a hood latch release cable thereto;
   C. handle mounting structure providing a substantially deep socket in which said stem is received and guided for forward movement of the handle out of a normal hood latched position to a hood unlatching position;
   D. a keeper carried by the handle mounting structure;
   E. a manually actuatable bolt carried by the handle and movable from an operative position engaged behind the keeper to an inoperative position freeing the handle for movement forwardly to its unlatching position;
   F. key controlled lock means on the handle for locking the bolt in said operative position thereof;
   G. the handle mounting structure providing a bearing at its front and an elongated socket rearwardly thereof, said socket having a non-circular cross section;
   H. and said stem having a cross section corresponding to that of the socket whereby the handle is constrained to translatory fore and aft motion relative to the handle mounting structure.

5. The lockable hood latch release mechanism of claim 4, further characterized by a mounting flange on the socket providing for securement of the handle mounting structure to a support.

6. The lockable hood latch release mechanism of claim 4, further characterized by:
   A. the keeper projecting inwardly from the wall of said bearing;
   B. and the handle having a portion which normally fits within said bearing and from which said stem projects, said portion having a notch opening to its rear, to receive the keeper in the normal hood latched position of the handle.

7. The lockable hood latch release mechanism of claim 6, wherein the junction between the handle and said portion thereon defines a rearwardly facing shoulder which engages the forward end of said bearing to define the normal hood latched position of the handle.

8. The lockable hood latch release mechanism of claim 7, further characterized by:
   A. the socket and stem having registering openings therein rearwardly adjacent to said bearing;
   B. said key controlled lock means comprising a lock cylinder rotatable on the axis of said bearing;
   C. and said bolt being fixed to the cylinder to rotate therewith and being normally located partly in said registering openings in the socket and stem.

9. The lockable hood latch release mechanism of claim 1, further characterized by:
   A. said stem having a hollow rear portion;
   B. a transverse wall on the rear of the stem closing said hollow rear portion thereof;
   C. and said cable attaching means comprising
      1. a bead engaged with the inner side of said transverse wall and fixed to the cable,
      2. a hole in one wall of said hollow rear portion of the stem large enough to enable said bead to be passed therethrough to the interior of the stem,
      3. and slit means in the rear portion of the stem communicating with said hole and extending continuously therefrom into said transverse wall on the rear of the stem, through which the cable projects.

10. The lockable hood latch release mechanism of claim 9, further characterized by:
    A. said hole being in one wall portion of the stem;
    B. and said slit means having one end portion in said transverse wall, its other end portion in said one wall portion of the stem and extending transversely thereof to said hole, and an intermediate portion of the slit means being located in a second wall portion of the stem, whereby attachment of the cable to the stem requires the bead to be passed through said hole while the cable is held crosswise of the length of the stem.

11. The lockable hood latch release mechanism of claim 10, wherein the socket embraces the zone of attachment of the cable to the stem to prevent displacement of its bead through the hole in the stem.

12. Lockable hood latch release mechanism, characterized by:
A. an elongated handle;
B. means on the rear of the handle providing for attachment thereto of a latch release cable;
C. a handle mounting bracket having a deep socket in which the handle is received and guided for forward movement from a hood latched position to a hood unlatched position;
D. a keeper carried by said bracket;
E. a key controlled lock cylinder mounted in the handle for rotation on an axis lengthwise of said socket;
F. a bolt carried by the cylinder and movable therewith to and from an operative position engaging said keeper to prevent forward movement of the handle to its unlatching position;
G. and cooperating means on the mounting bracket and the handle constraining the latter to translatory fore and aft movement.

13. The lockable hood latch release mechanism of claim 12, further characterized by cooperating rotation arresting means on the cylinder and handle defining the operative handle locking position of the bolt as well as an inoperative position thereof at which the handle can be pulled forwardly to its unlatched position.

14. Lockable hood latch release mechanism characterized by:
A. a handle;
B. means on the handle providing for attachment thereto of a latch release element;
C. a handle mounting bracket having a socket to receive a portion of the handle and guide the same for forward motion from a hood latched position to a hood unlatched position;
D. cooperating bolt and keeper members carried by the handle and bracket and operable to prevent movement of the handle to its hood unlatched position except upon movement of one of said members to a handle releasing position
E. means for locking said one member against movement to its said handle releasing position;
F. and complementary male and female walls of non-circular cross section on the socket and handle portion at all times constraining the handle to translatory fore and aft motion.

15. Lockable hood latch release mechanism, characterized by:
A. an elongated handle having a bore the axis of which is disposed lengthwise of the handle;
B. a handle mounting bracket having a socket in which a portion of the handle is received to guide the handle for forward lengthwise movement along the axis of said bore, from a hood latched position to a hood unlatched position;
C. a key controlled lock cylinder rotatably mounted in the handle bore;
D. a keeper carried by the mounting bracket;
E. a bolt carried by the cylinder and movable therewith from an operative keeper engaging position preventing forward movement of the handle to its hood unlatched position in a locked position of cylinder rotation to an inoperative position in a first unlocked position of cylinder rotation allowing such forward movement of the handle without interference from the keeper;
F. a lug on the handle disposed alongside the keeper and engageable by the bolt to prevent forward disassembling motion of the lock cylinder from said bore;
G. means on the bolt defining a gate to accept both the lug and the keeper in a second unlocked position of cylinder rotation;
H. and means to normally prevent rotation of the cylinder to said second unlocked position thereof.

* * * * *